(12) United States Patent
Katou et al.

(10) Patent No.: US 7,513,145 B2
(45) Date of Patent: Apr. 7, 2009

(54) TIRE PRESSURE DETECTING DEVICE AND TIRE MONITOR SYSTEM

(75) Inventors: Michiya Katou, Ogaki (JP); Yasuaki Hattori, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 212 days.

(21) Appl. No.: 11/486,263

(22) Filed: Jul. 14, 2006

(65) Prior Publication Data

US 2007/0180901 A1 Aug. 9, 2007

(30) Foreign Application Priority Data

Feb. 6, 2006 (JP) .............................. 2006-028519

(51) Int. Cl.
*B60C 23/02* (2006.01)
(52) U.S. Cl. ..................................... 73/146.2; 340/447
(58) Field of Classification Search ........ 73/146–146.8; 340/442–447
See application file for complete search history.

(56) References Cited

U.S. PATENT DOCUMENTS

| 4,966,034 | A | * | 10/1990 | Bock et al. ................. 73/146.5 |
| 5,774,048 | A | | 6/1998 | Achterholt |
| 5,825,286 | A | * | 10/1998 | Coulthard .................... 340/447 |
| 5,965,808 | A | * | 10/1999 | Normann et al. ........... 73/146.5 |
| 6,087,930 | A | | 7/2000 | Kulka et al. |
| 6,359,556 | B1 | * | 3/2002 | Katou ......................... 340/506 |
| 6,486,776 | B1 | | 11/2002 | Pollack et al. |
| 6,958,686 | B2 | * | 10/2005 | Okubo ......................... 340/447 |
| 7,055,380 | B2 | * | 6/2006 | Ibuka et al. .................... 73/146 |
| 2002/0092345 | A1 | * | 7/2002 | Van Niekerk et al. .......... 73/146 |
| 2002/0092346 | A1 | * | 7/2002 | Niekerk et al. .............. 73/146.2 |
| 2002/0092347 | A1 | * | 7/2002 | Niekerk et al. .............. 73/146.2 |

FOREIGN PATENT DOCUMENTS

| JP | A 11-240315 | 9/1999 |
| JP | A 2002-211219 | 7/2002 |
| JP | A 2002-264617 | 9/2002 |
| JP | A 2002-324281 | 11/2002 |
| JP | A 2002-329268 | 11/2002 |
| JP | A 2003-508299 | 3/2003 |
| JP | A 2003-509260 | 3/2003 |
| JP | A 2004-189034 | 7/2004 |
| JP | A 2005-96726 | 4/2005 |
| JP | A 2005-193743 | 7/2005 |
| WO | WO 02/07993 A2 | 1/2002 |

* cited by examiner

*Primary Examiner*—Andre J Allen
(74) *Attorney, Agent, or Firm*—Oliff & Berridge, PLC

(57) ABSTRACT

A tire pressure detecting device fixed to a wheel with a tire includes a pressure sensor detecting an internal pressure of the tire and transmits data of detection by the pressure sensor to a vehicle body by radio. The tire pressure detecting device further includes a compensation data storage storing compensation data for detection error specific to the pressure sensor and a compensation data transmitter obtaining the compensation data from the compensation data storage, transmitting the obtained compensation data to the vehicle body by radio.

25 Claims, 12 Drawing Sheets

TIRE PRESSURE DETECTING DEVICE AND TIRE MONITOR SYSTEM

BACKGROUND OF THE INVENTION

1. Field of the Invention

The present invention relates to a tire pressure detecting device and a tire monitor system both of which detect an internal pressure of a tire and transmit data of results of detection between a wheel and a vehicle body by radio.

2. Description of the Related Art

One of known tire pressure detecting devices comprises a transponder with a pressure sensor connected thereto. When receiving radio waves transmitted from a vehicle body, the tire pressure detecting device detects an internal pressure of a tire with the pressure sensor, sending data of the detection back to the vehicle body. For example, JP-A-2004-189034 discloses one of the above-noted tire pressure detecting devices.

The tire pressure detecting devices have recently come into wide use. However, lower cost and higher precision are required of the tire pressure detecting device for further widespread diffusion.

SUMMARY OF THE INVENTION

Therefore, an object of the present invention is to provide a tire pressure detecting device and a tire monitor system both of which can render the cost lower and the precision higher.

The present invention provides a tire pressure detecting device fixed to a wheel with a tire and including a pressure sensor detecting an internal pressure of the tire. The device transmits data of detection by the pressure sensor to a vehicle body by radio. The device further comprises a compensation data storage storing compensation data for detection error specific to the pressure sensor and a compensation data transmitter obtaining the compensation data from the compensation data storage, transmitting the obtained compensation data to the vehicle body by radio.

According to the above-described arrangement, the tire pressure detecting device transmits, to the vehicle body, the compensation data for detection error of the pressure sensor as well as the detection data detected by the pressure sensor. Accordingly, the detection error of the pressure sensor can be eliminated from the detection data at the vehicle body side by using the compensation data. Consequently, since precise detection data can be obtained at the vehicle body side irrespective of unevenness in the detection error of the pressure sensor, the tire pressure detecting device can achieve a higher detecting precision than conventional devices. Furthermore, since a pressure sensor with high unevenness of detection error can be used in the tire pressure detecting device, cost reduction can be achieved.

It is supposed that the compensation data for each pressure sensor is stored at the vehicle body side. In the foregoing arrangement, the tire pressure detecting device is provided with both pressure sensor and compensation data storage storing the compensation data, both of which are fixed to the same wheel. Consequently, consistency can be maintained between the pressure sensor and the compensation data even when the wheel is distributed apart from the vehicle body.

In a preferred form, the tire pressure detecting device further comprises a transponder including the compensation data storage and the compensation data transmitter and transmitting by radio the compensation data according to a radio signal delivered from the vehicle body side. The transponder is comprised of a mass-produced RFID tag. As the result of this arrangement, further cost reduction can be achieved.

In another preferred form, the tire is provided with a tire valve to which the pressure sensor and the transponder are both fixed. As a result, since the pressure sensor and the transponder are not separated from each other even when tires or tire wheels are replaced by others, consistency can be maintained between the detection error specific to the pressure sensor and the compensation data.

In further another preferred form, the tire pressure detecting device further comprises a detection data transmitter for transmitting the detection data by radio apart from the transponder. Consequently, since the tire pressure detecting device can be obtained by adding a transponder to a conventional tire pressure detecting device, the work for designing the tire pressure detecting device can be simplified and the conventional product can effectively be used.

Additionally, in further another form, a tire monitor system comprised of the tire pressure detecting device, a compensation data obtaining unit provided on the vehicle body for delivering a radio signal so that the transponder transmits the compensation data, thereby receiving the compensation data, and a detection data processing unit provided on the vehicle body for receiving the detection data from the detection data transmitter and obtaining the compensation data from the compensation data obtaining unit, thereby compensating the detection data based on the compensation data. The compensation data obtaining unit is a tag reader/writer. Consequently, the compensation data can easily be written on the RFID tag using the tag reader/writer before shipment or on maintenance work of the tire monitor system.

BRIEF DESCRIPTION OF THE DRAWINGS

Other objects, features and advantages of the invention will become clear upon reviewing the following description of the embodiments with reference to the accompanying drawings, in which.

DETAILED DESCRIPTION OF THE INVENTION

Figure 1:
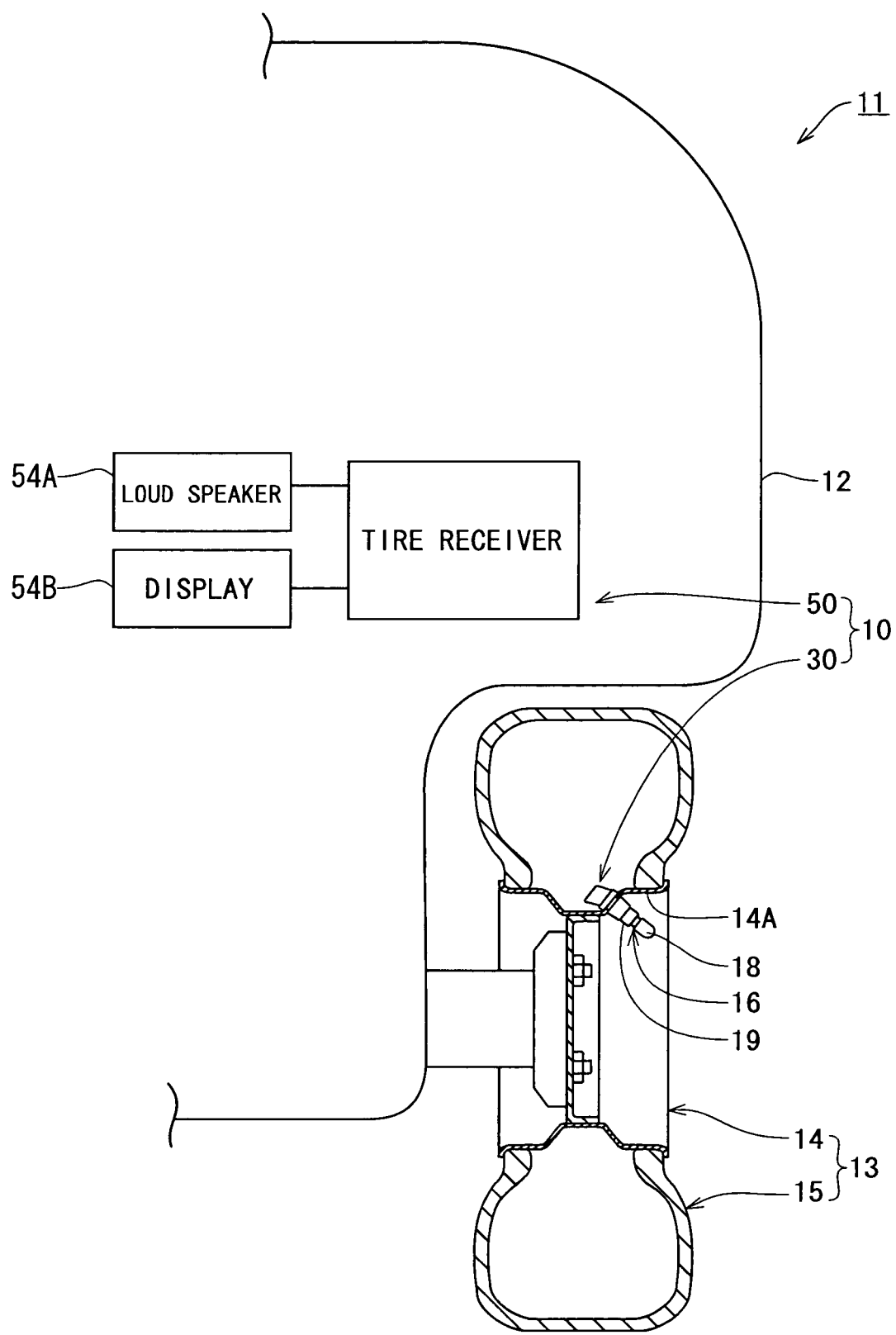
FIG. 1 illustrates a concept of a tire monitor system in accordance with a first embodiment of the invention.

A first embodiment of the present invention will be described with reference to FIGS. 1 to 3. Referring to FIG. 1, a tire monitor system 10 of a first embodiment is shown. The tire monitor system 10 includes tire pressure detecting devices 30 mounted on, for example, four wheels 13 of a vehicle 11 respectively and one tire receiver 50 mounted on a body 12 of the vehicle 11. FIG. 1 shows only one of the four wheels 13.

The wheel 13 includes a tire wheel 14 with a rim 14A with which a tubeless tire 15 is fitted. The rim 14A is formed with a valve mount hole 14C, in which a tire valve 16 is fixed, as shown in FIG. 2. The tire valve 16 includes a cylindrical valve stem 16A having both open ends and a valve core 17 of a check valve structure disposed in the valve stem 16A. The tire valve 16 has a distal end protruding to an inner circumferential side of the rim 14A, whereas a proximal end of the tire valve 16 protrudes to an outer circumferential side of the rim 14A, being disposed in the tire 15. The tire valve 16 further has an outer surface formed with a male thread 16B having a distal end with which a cap 18 is in threading engagement.

The tire pressure detecting device 30 mounted on each wheel 13 comprises a detecting device body 31 fixed to the proximal end of the tire valve 16 and disposed in the tire 15 and a radio frequency identification (RFID) assembly 20 brought into threading engagement with the male thread 16B of the tire valve 16 and disposed outside the tire 15.

The detecting device body 31 includes a circuit board 38, a microcell 39 and an antenna 35 all of which are enclosed in a case 37 fixed to the tire valve 16. On the circuit board 38 are mounted a memory 36, a control 32, a radio circuit 33, a pressure sensor 40, a temperature sensor 41 and an acceleration sensor 42, as shown in FIG. 3. The microcell 39 supplies electric power to circuits comprised of the memory 36, the control 32, the radio circuit 33, etc. on the circuit board 38, thereafter the circuits are activated. The control 32 and the radio circuit 33 constitute a detection data transmitter 31S in the invention.

The memory 36 constitutes an identification data storage together with a memory 26 provided in a radio frequency identification (RFID) tag 21 which will be described later. The memory 36 stores identification data set for every tire pressure detecting device 30.

The pressure sensor 40 comprises a pressure sensitive element (not shown) changing electric resistance thereof according to pressure and a detecting circuit (not shown) converting the changes in the electric resistance to a voltage signal. The pressure sensor 40 is designed so as to hold the following equation (1):

$$E1 = K1 \cdot p \quad (1)$$

where p is a predetermined range of pressure, E1 is output voltage of the pressure sensor 40 against the pressure p, and K1 is a predetermined constant. However, an actual output voltage E2 of the pressure sensor 40 is offset by an error constant C1 from the design output voltage E1 as shown in the following equation (2). The error constant C1 varies among pressure sensors 40 though constant in the predetermined range of pressure p:

$$E2 = K1 \cdot p + C1 = E1 + C1 \quad (2)$$

Furthermore, the temperature sensor 41 comprises a temperature sensitive element (not shown) changing electric resistance thereof according to temperature and a detecting circuit (not shown) converting the changes in the electric resistance to a voltage signal. The temperature sensor 41 is designed so as to hold the following equation (3):

$$E11 = K2 \cdot t \quad (3)$$

where t is a predetermined range of temperature, E11 is output voltage of the temperature sensor 41 against the temperature t, and K2 is a predetermined constant. As in the pressure sensor 40, an actual output voltage E12 of the temperature sensor 41 is offset by an error constant C2 from the design output voltage E11 as shown in the equation (4). The error constant C2 varies among temperature sensors 41 though constant in the predetermined range of temperature t:

$$E12 = K2 \cdot t + C2 = E11 + C2 \quad (4)$$

On condition that the acceleration sensor 42 has detected a centrifugal force due to rotation of the wheel 13, the control 32 executes a preset program to capture as detection data the output voltages E2 and E12 of the pressure and temperature sensors 40 and 41 respectively. The control 32 then adds identification data to the detection data, and the detection data with the identification data is converted into a radio signal by the radio circuit 33 to be transmitted from the antenna 35.

Figure 2:
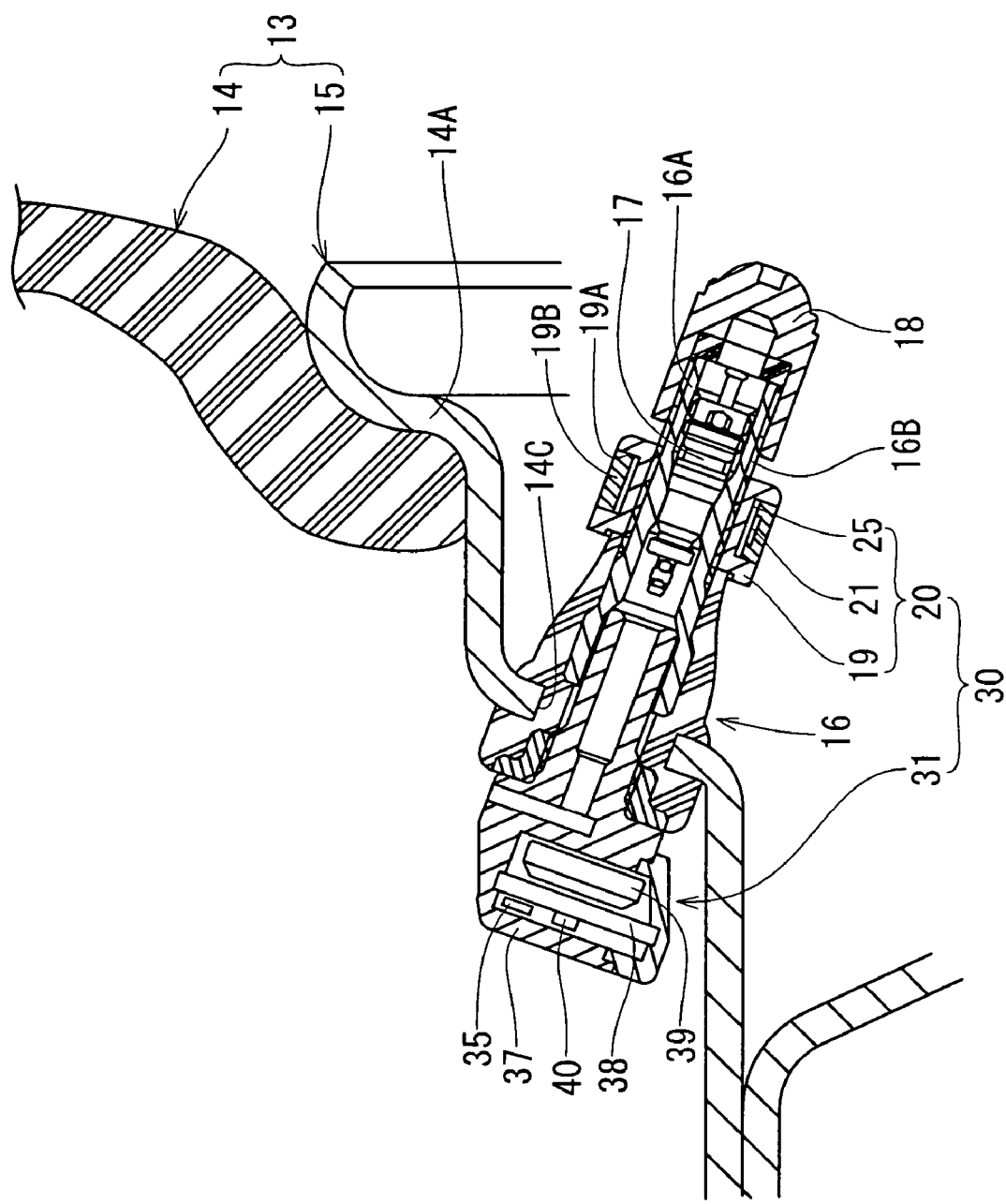
FIG. 2 is a sectional view of a wheel and a tire pressure detecting device.

The RFID assembly 20 comprises a ring member 19 in threading engagement with the proximal end of the male thread 16B of the tire valve 16, an antenna 25 and a radio frequency identification (RFID) tag 21 both of which are fixed to the ring member 19, as shown in FIG. 2. The RFID tag 21 serves as a transponder in the invention. The ring member 19 has an outer circumferential surface formed with an annular groove 19A. The antenna 25 is composed of an electric wire wound in the annular groove 19A. The RFID tag 21 is fixed to an outer circumferential surface of the antenna 25. The annular groove 19A is filled with a molded resin 19B so that the RFID tag 21 and the antenna 25 are covered with the molded resin 19B.

Figure 3:
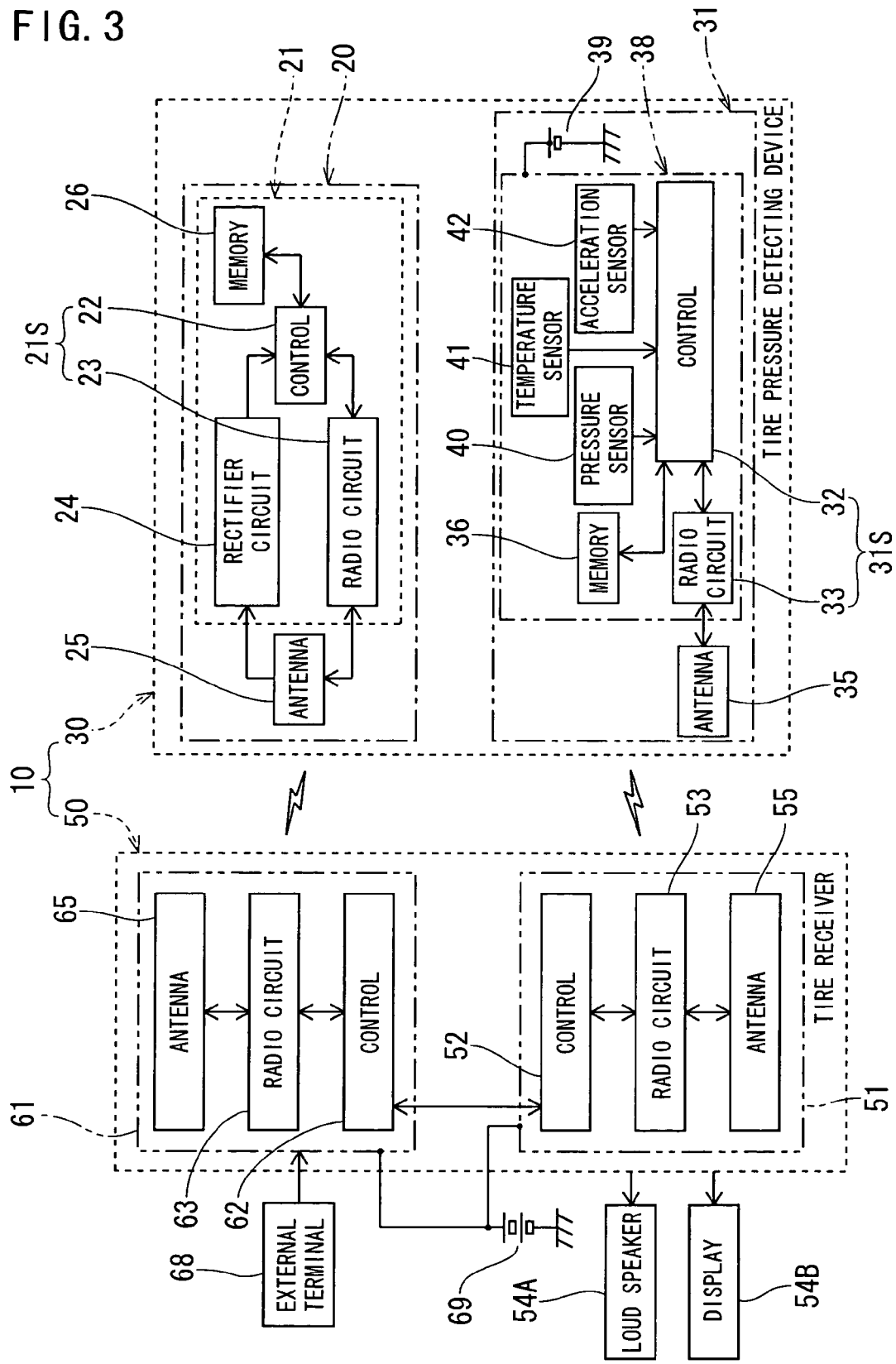
FIG. 3 is a block diagram showing an electrical arrangement of the tire monitor system.

The RFID tag 21 includes the memory 26, a control 22, a radio circuit 23 and a rectifier circuit 24 as shown in FIG. 3. The control 22 and the radio circuit 23 constitute a compensation data transmitter 21S in the invention.

The memory 26 of the RFID tag 21 serves as a compensation data storage in the invention and constitutes an identification data storage together with the memory 36 of the detecting device body 31. The memory 26 stores the same identification data as the memory 36 stores. The memory 26 further stores compensation data specific to the pressure sensor 40 of each tire pressure detecting device 30 and compensation data specific to the temperature sensor 41 of each tire pressure detecting device 30. More specifically, the memory 26 stores the aforesaid error constant C1 as the compensation data specific to the pressure sensor 40 and the aforesaid error constant C2 as the compensation data specific to the temperature sensor 41.

The rectifier circuit 24 receives an external electric wave and converts AC voltage electromagnetically induced on the antenna 25 to DC voltage by the received electric wave, supplying the converted DC voltage to the control 22. As a result, the control 22 is actuated to execute the preset program, obtaining through the radio circuit 23 information contained in the electric wave received by the antenna 25. When the obtained information contains a data transmission command, the control 22 reads compensation data (that is, error constants C1 and C2) and identification data from the memory 26. The control 22 then adds the identification data to the compensation data. The compensation data added with the identification data is converted to radio signals by the radio circuit 23 to be transmitted from the antenna 25. Furthermore, when the obtained data contains a data update command and update data, the compensation data and/or identification data both stored on the memory 26 is updated according to the update data.

Thus, the tire pressure detecting device 30 of the embodiment transmits by radio detection data containing detection errors of the pressure and temperature sensors 40 and 41 and further transmits by radio compensation data corresponding to the detection errors of the pressure and temperature sensors 40 and 41.

The tire receiver 50 comprises a detection data processing unit 51 and a compensation data obtaining unit 61. The detection data processing unit 51 and the compensation data obtaining unit 61 are supplied with electric power by a battery 69 provided on the vehicle body 12 and are activated. The detection data processing unit 51 transmits and receives radio signals to and from the detecting device body 31 of the tire pressure detecting device 30. The compensation data obtaining unit 61 transmits and receives radio signals to and from the RFID tag 21 of the tire pressure detecting device 30.

More specifically, the compensation data obtaining unit 61 is a tag reader/writer and comprises an antenna 65, a radio circuit 63 and a control 62. The control 62 normally converts a signal containing the data transmission command to a radio signal by the radio circuit 63 and delivers the radio signal from the antenna 65. The RFID tag 21 receives the radio signal delivered from the antenna 65, obtaining the compensation data and the identification data contained in the received radio signal. Furthermore, the compensation data obtaining unit 61 is connectable to an external terminal 68. When the external terminal 68 supplies the update data to the compensation data obtaining unit 61, the control 62 converts the data update command and the update data into radio signals by the radio circuit 63 and delivers the radio signals from the antenna 65.

The detection data processing unit 51 comprises a control 52, a radio circuit 53 and an antenna 55. The control 52 is connected to the control 62 of the compensation data obtaining unit 61. The detection data processing unit 51 takes the detection data transmitted from the detecting device 30 via the antenna 55 and the radio circuit 53 into the control 52 of the detection data processing unit 51. Furthermore, the detection data processing unit 51 takes in, from the compensation data obtaining unit 61, compensation data added with the same identification data as that added to the detection data. More specifically, on condition that the detection data transmitted from the detecting device 30 by radio has been captured, the control 52 of the detection data processing unit 51 requests the compensation data obtaining unit 61 for compensation data. In response to the request, the compensation data obtaining unit 61 transmits data transmission command to the RFID tag 21 by radio and supplies compensation data returned from the RFID tag 21 to the control 52 of the detection data processing unit 51 as described above.

The control 52 of the detection data processing unit 51 executes a preset program to compensate the detection data using the compensation data. More specifically, the error constant C1 of the compensation data of the pressure sensor 40 is subtracted from the output voltage E2 of the detection data of the pressure sensor 40 as shown by the following equation (5):

$$E3=E2-C1=E1 \quad (5)$$

Furthermore, the error constant C2 of the compensation data of the temperature sensor 41 is subtracted from the output voltage E12 of the detection data of the temperature sensor 41 as shown by the equation (6):

$$E13=E12-C2=E11 \quad (6)$$

The compensated values E3 and E13 are multiplied by the respective predetermined constants so that the internal pressure and temperature of the tire 15 are obtained. Based on whether the obtained internal pressure and temperature have exceeded respective predetermined reference values, whether the tire 15 is abnormal is determined.

The operation of the tire monitor system will now be described. Upon drive of the vehicle 11, the centrifugal force is detected by the acceleration sensor 42 of each tire pressure detecting device 30 mounted on the four wheels 13 and the detection data of the pressure and temperature sensors 40 and 41 are transmitted by radio. These detection data are received by the tire receiver 50 disposed at the vehicle body 12 side. The tire receiver 50 obtains the compensation data corresponding to each received detection data from the RFID tag 21 and compensates the detection data by using the compensation data. Consequently, precise internal pressure and temperature of the tire 15 can be obtained at the vehicle body 12 side. Furthermore, when anything is wrong with the internal pressure or temperature, the tire receiver 50 activates, for example, a loud speaker 54A (see FIG. 3) provided on the vehicle body 12 so that warning sound is produced or a display 54B (see FIG. 3) provided on the vehicle body 12 so that a warning message is displayed on the display 54B. As a result, abnormality of the tire 15 can quickly be coped with.

According to the foregoing embodiment, the compensation data against the detection error specific to the pressure and temperature sensors 40 and 41 as well as the detection data obtained by the respective pressure and temperature sensors 40 and 41 are transmitted from the tire pressure detecting device 30 to the vehicle body 12. Accordingly, the detection error can be eliminated from the detection data at the vehicle body 12 side by using the compensation data. Consequently, the detection precision can be improved as compared with the conventional tire pressure detectors since precise detection data can be obtained at the vehicle body 12 side irrespective of unevenness in the detection error of the pressure and temperature sensors 40 and 41. Furthermore, since pressure sensors or temperature sensors with higher unevenness in the detection error than conventional sensors can be used in the tire pressure detecting device 30, cost reduction can be achieved.

Moreover, when the RFID tag 21 is provided to a conventional tire pressure detecting device, the tire pressure detecting device 30 of the embodiment can be obtained. Consequently, the work for designing the tire pressure detecting device can be simplified and the conventional product can effectively be used. Furthermore, since the RFID 21 is designed so as to obtain electric power from the received electric waves, a problem of battery exhaustion can be avoided. Still furthermore, before shipment or on maintenance work of the tire monitor system 10, the compensation data can easily be written onto the RFID tag 21 by using the compensation data obtaining unit 61 serving as the tag reader/writer. Additionally, the ring member 19 to which the RFID tag 21 is fixed is brought into threading engagement with the male thread 16B of the tire valve 16 in the foregoing embodiment. Consequently, the RFID tag 21 can easily be attached to the tire valve 16 or replaced by another. Still additionally, further cost reduction of the tire monitor system 10 can be achieved by using the mass-produced RFID tags 21.

It is supposed that the compensation data specific to each pressure sensor 40 is stored in the tire receiver 50 at the vehicle body 12 side. In the foregoing arrangement, the tire pressure detecting device 30 is provided with both pressure sensor 40 and memory 26 storing the compensation data, both of which are fixed to the same wheel 13. Consequently, consistency can be maintained between the pressure sensor 40 and the compensation data even when the wheel 13 is distributed apart from the vehicle body 12. Furthermore, the pressure sensor 40 and the RFID tag 21 are fixed to the tire valve 16 together. Accordingly, the pressure sensor 40 and the RFID tag 21 can not be separated from each other even when the tires 15 or tire wheels 14 are replaced.

Although the detecting device body 31 is provided with the microcell 39 as the power supply in the foregoing embodiment, the microcell may be eliminated and the radio circuit 33 may be used as the power supply, instead. More specifically, electric power may be extracted from the electric waves the radio circuit 33 receives via the antenna 35, so that the extracted electric power may energize the whole detecting device body 31.

Figure 4:
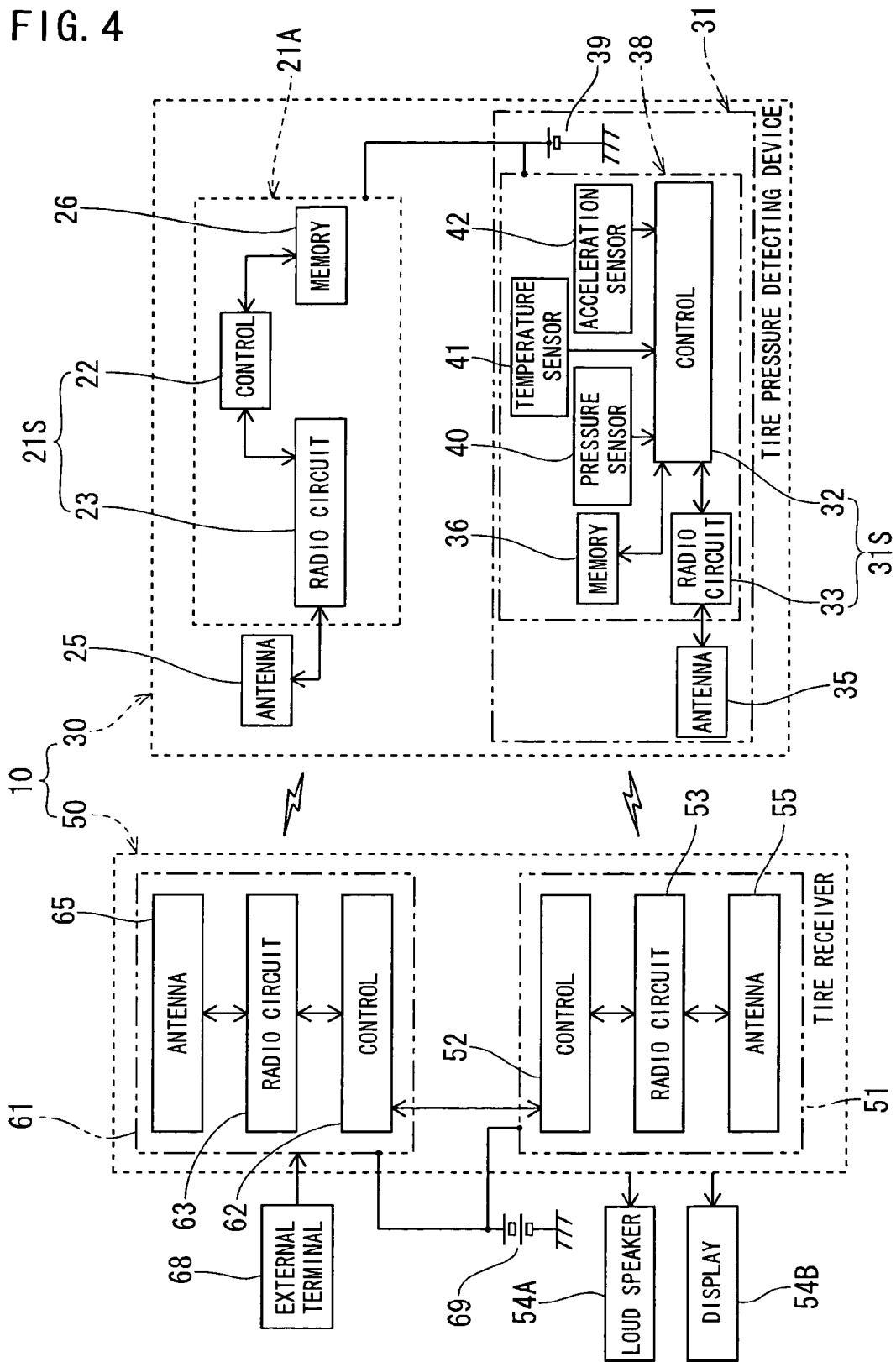
FIG. 4 is a block diagram showing an electrical arrangement of the tire monitor system in accordance with a second embodiment of the invention.

FIG. 4 illustrates a second embodiment of the invention. The tire monitor system 10 of the second embodiment includes a transponder 21A actuated by electric power supplied from the microcell 39, instead of the RFID tag 21 of the first embodiment. The transponder 21A is enclosed in a case 37 (see FIG. 2), for example. The other arrangement of the tire monitor system 10 of the second embodiment is the same as that of the first embodiment. Identical or similar parts in the second embodiment are labeled by the same reference symbols as those in the first embodiment, and the description of these parts will be omitted. The second embodiment can achieve the same effect as the first embodiment.

Figure 5:
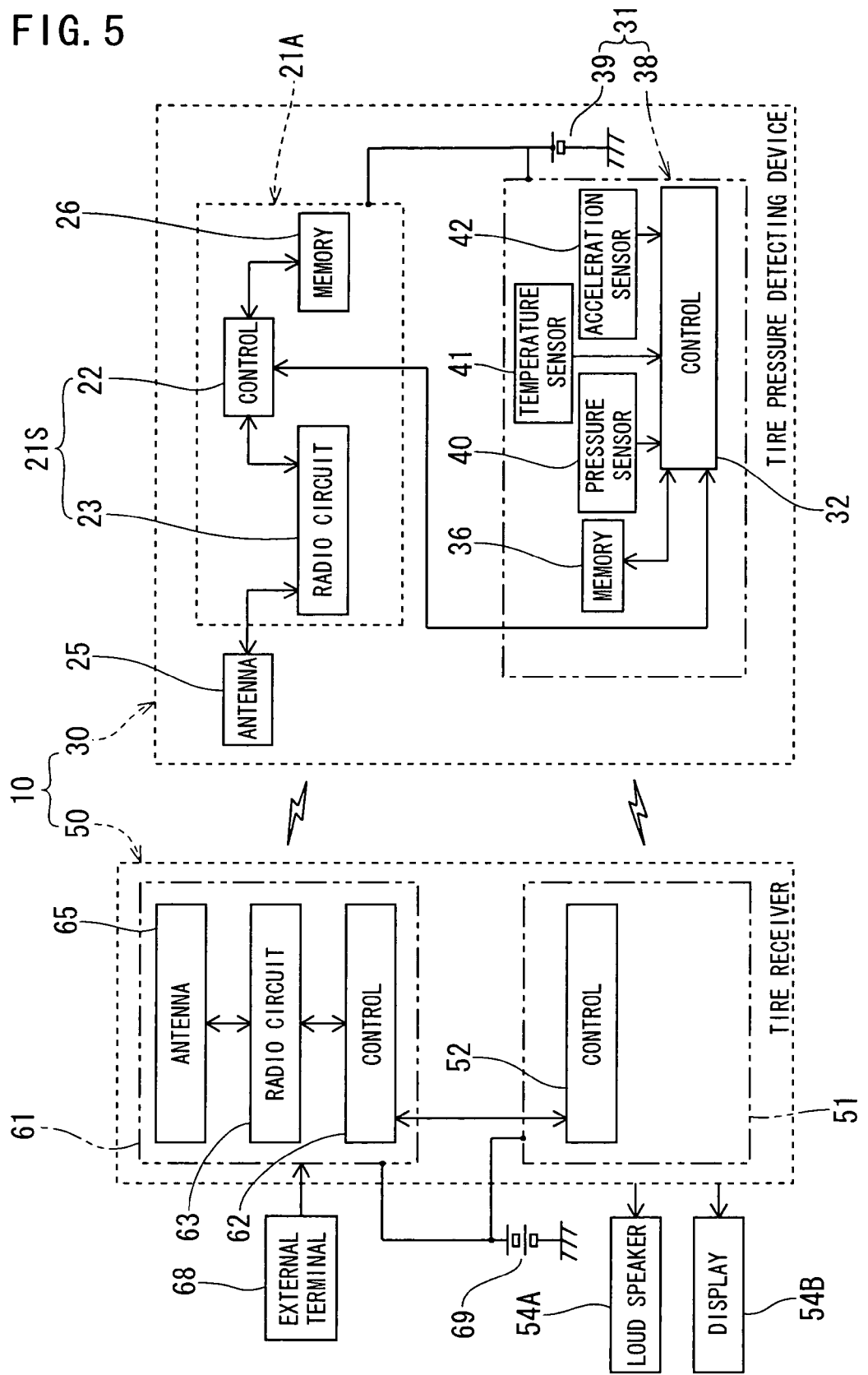
FIG. 5 is a block diagram showing an electrical arrangement of the tire monitor system in accordance with a third embodiment of the invention.

FIG. 5 illustrates a third embodiment of the invention. In the tire pressure detecting device 30 of the third embodiment, the antenna 35 and the radio circuit 33 of the detecting device body 31 are eliminated and the control 32 of the detecting device body 31 is connected to the control 22 of the transponder 21A, as shown in FIG. 5. Furthermore, the radio circuit 23 of the transponder 21A and the antenna 25 are also used for transmission and reception of radio signals by the detecting device body 31. In the tire receiver 50, too, the antenna 55 and the radio circuit 53 are accordingly eliminated from the detection data processing unit 51 in the second embodiment, and the radio circuit 63 and the antenna 65 of the compensation data obtaining unit 61 are also used for transmission and reception of radio signals by the detection data processing unit 51. The other arrangement of the tire monitor system 30 of the third embodiment is the same as that of the second embodiment. Identical or similar parts in the third embodiment are labeled by the same reference symbols as those in the second embodiment, and the description of these parts will be omitted. The third embodiment can achieve the same effect as the second embodiment.

Figure 6:
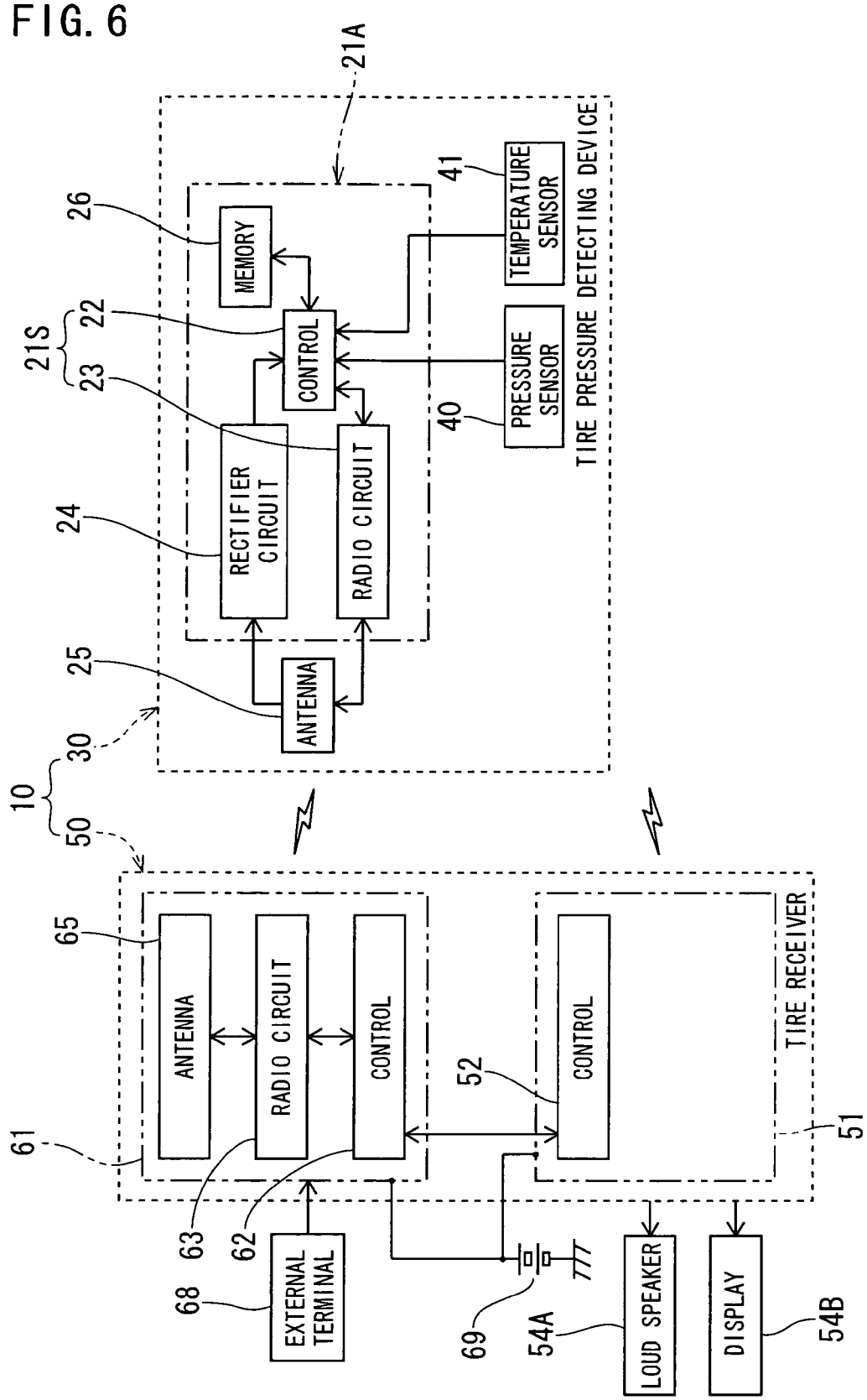
FIG. 6 is a block diagram showing an electrical arrangement of the tire monitor system in accordance with a fourth embodiment of the invention.

FIG. 6 illustrates a fourth embodiment of the invention. In the tire monitor system 10 of the fourth embodiment, the detecting device body 31 in the first embodiment is eliminated from the tire pressure detecting device 30, and the pressure sensor 40 and the temperature sensor 41 are connected to the control 22 of the transponder 21A. The other arrangement of the tire monitor system 10 of the fourth embodiment is the same as that of the third embodiment. Identical or similar parts in the fourth embodiment are labeled by the same reference symbols as those in the third embodiment, and the description of these parts will be omitted. The arrangement of the fourth embodiment can reduce the size of the tire pressure detecting device 30.

Figure 7:
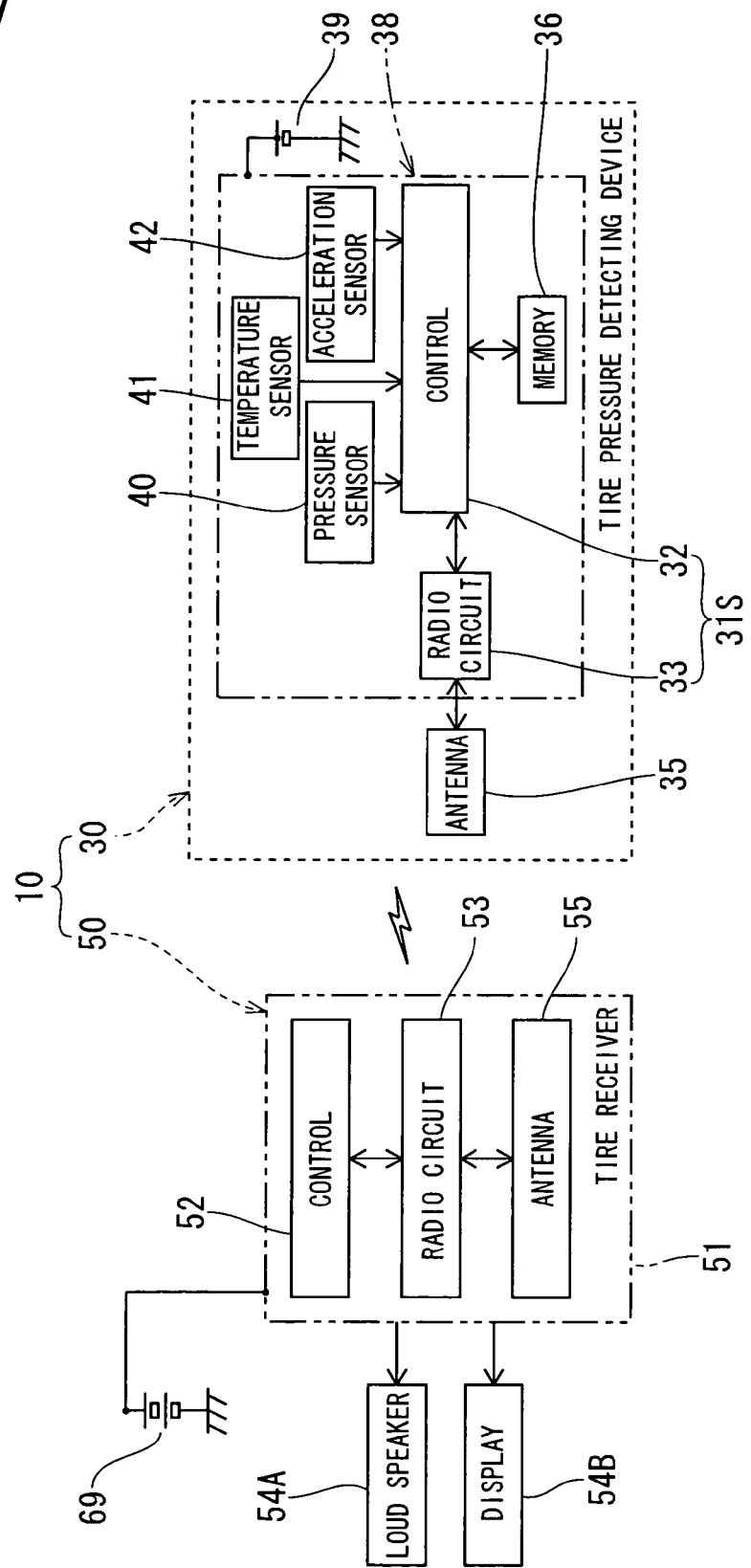
FIG. 7 is a block diagram showing an electrical arrangement of the tire monitor system in accordance with a fifth embodiment of the invention.

FIG. 7 illustrates a fifth embodiment of the invention. In the tire pressure detecting device 30 of the fifth embodiment, the RFID tag 21 used in the first embodiment is eliminated, and the memory 36 provided in the detecting device body 31 serves as a compensation data storage in the invention. The memory 36 stores compensation data specific to both pressure and temperature sensors 40 and 41. Furthermore, the detection data transmitter 31S comprising the control 32 and the radio circuit 33 serves as compensation data transmitter in the invention. Accordingly, the compensation data obtaining unit 61 described in each of the first to third embodiments is eliminated from the tire receiver 50. Additionally, the control 32 of the detecting device body 31 adds compensation data to detection data of the pressure and temperature sensors 40 and 41, transmitting the data obtained by addition. The other arrangement of the tire monitor system 10 of the fifth embodiment is the same as that of the first embodiment. Identical or similar parts in the fifth embodiment are labeled by the same reference symbols as those in the first embodiment, and the description of these parts will be omitted. The fifth embodiment can simplify the arrangement of the tire monitor system 10, and a conventional tire monitor system can easily be replaced with the tire monitor system 10 of the embodiment.

The invention should not be limited to the foregoing embodiments but encompasses the following modified forms. Furthermore, the invention may be practiced in forms other than the following without departing from the scope thereof.

Figure 8:
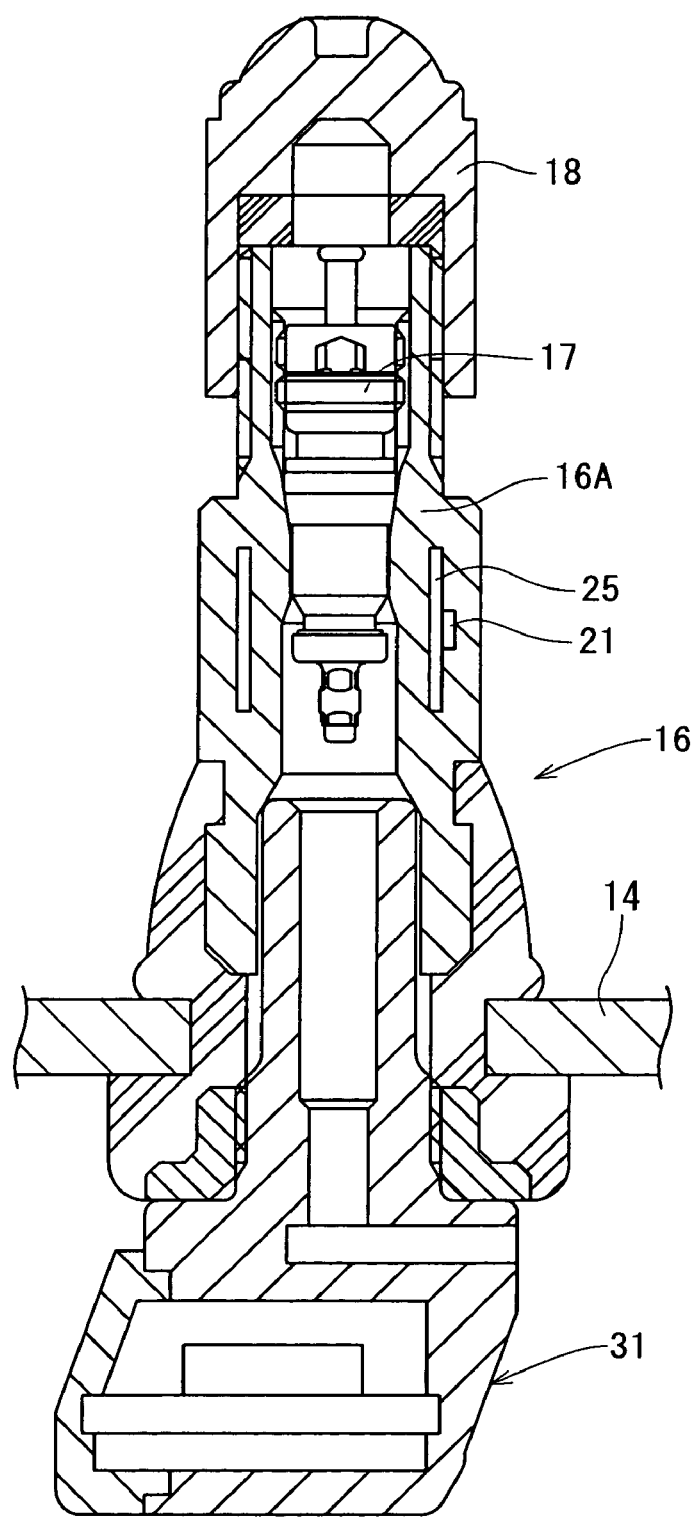
FIG. 8 is a sectional view of a tire valve in modified form 1.
Figure 9:
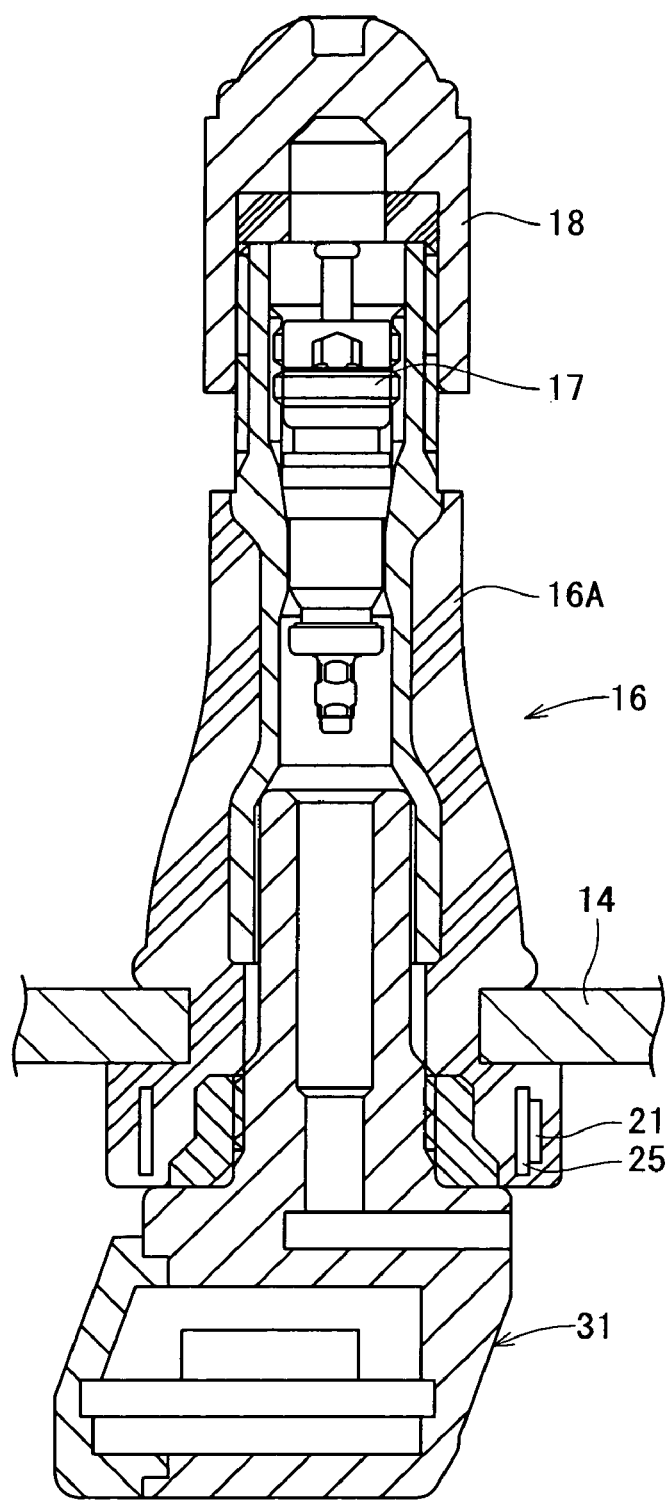
FIG. 9 is a sectional view of the tire valve.

(1) Although the ring member 19 to which the RFID tag 21 is fixed is separable from the tire valve 16 in the first embodiment, the RFID tag 21 and the antenna 25 may be embedded in a wall of the valve stem 16A constituting the tire valve 16 so as to be inseparable from the tire valve 16. In this case, the RFID tag 21 and the antenna 25 may be embedded in a part of the cylindrical wall of the valve stem 16A, which is located outside the tire wheel 14, as shown in FIG. 8. Alternatively, the RFID tag 21 and the antenna 25 may be embedded in another part of the cylindrical wall of the valve stem 16A, which is located inside the tire wheel 14, as shown in FIG. 9.

Figure 10:
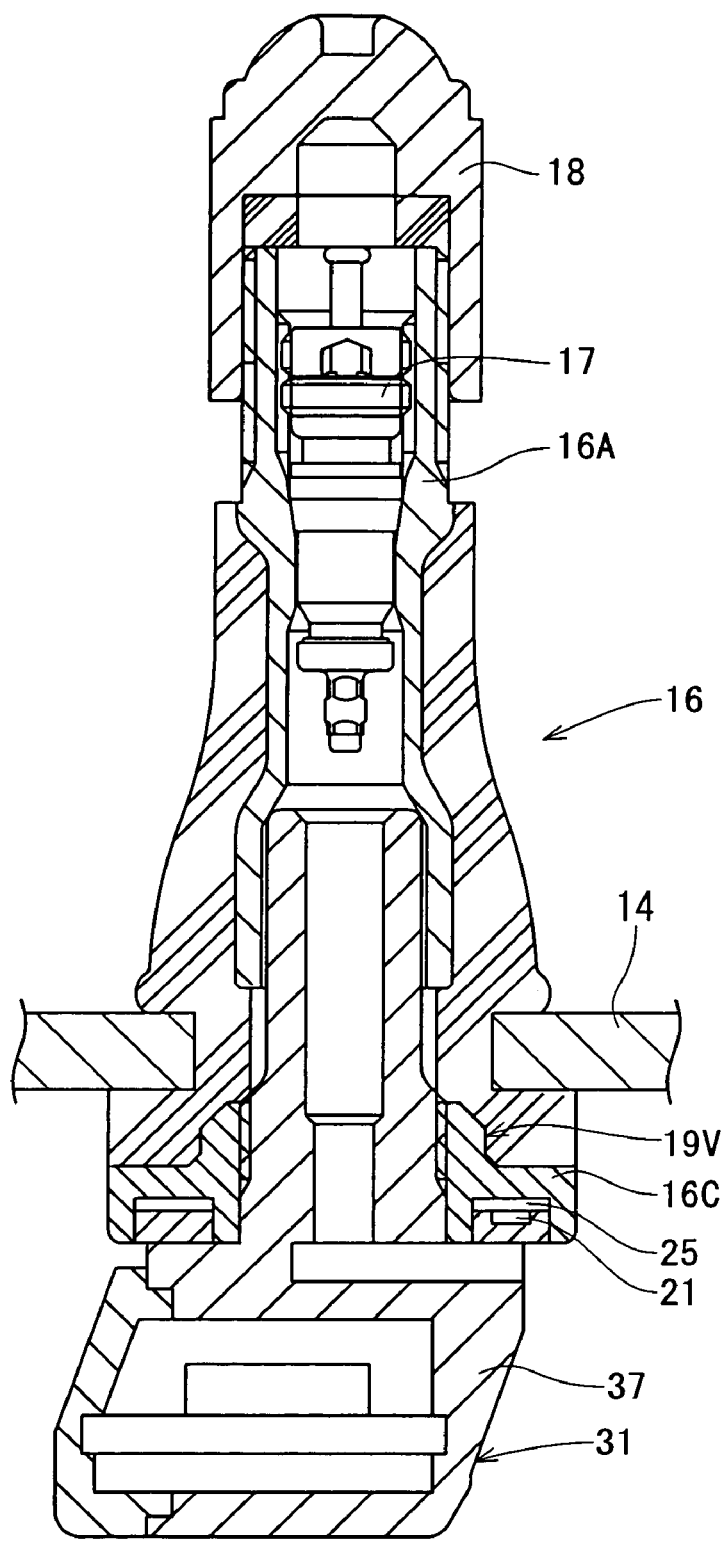
FIG. 10 is a sectional view of a tire valve in modified form 2.

(2) Furthermore, the ring member 19 to which the RFID tag 21 and the antenna 25 are fixed is fitted with the outer circumference of the valve stem 16A in the first embodiment. However, a ring member 19V to which the RFID tag 21 and the antenna 25 are fixed may be disposed at the proximal end of the valve stem 16A thereby to be held between the valve stem 16A and the case 37 of the detecting device body 31, as shown in FIG. 10.

Figure 11:
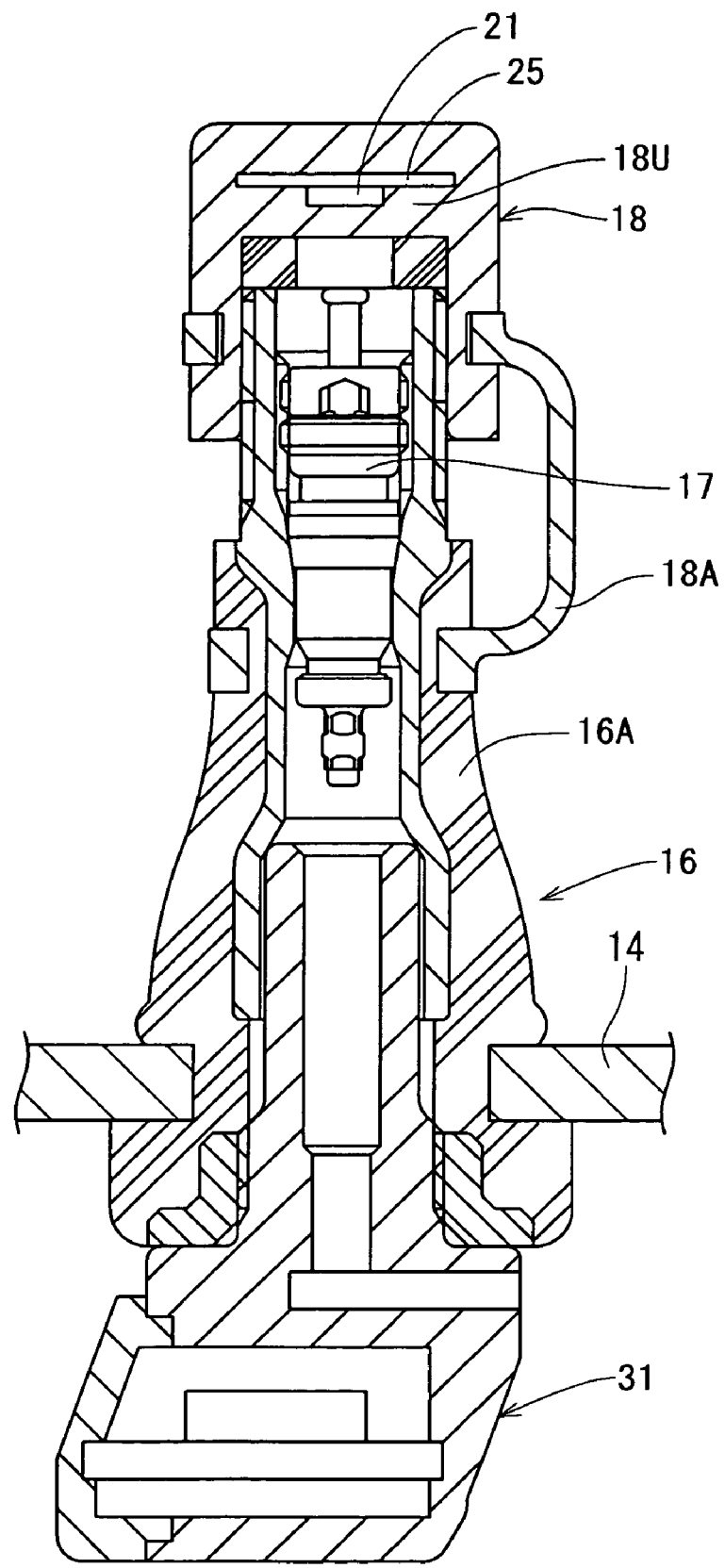
FIG. 11 is a sectional view of a tire valve in modified form 3.

(3) Furthermore, the RFID tag 21 and the antenna 25 may be embedded in a ceiling wall 18U of the cap 18 for closing the distal end of the tire valve 16 as shown in FIG. 11. In this case, it is preferable that the valve stem 16A and the cap 18 are connected by a connecting piece 18A so that the cap 18 is prevented from leaving the valve stem 16A by a predetermined distance or more.

Figure 12:
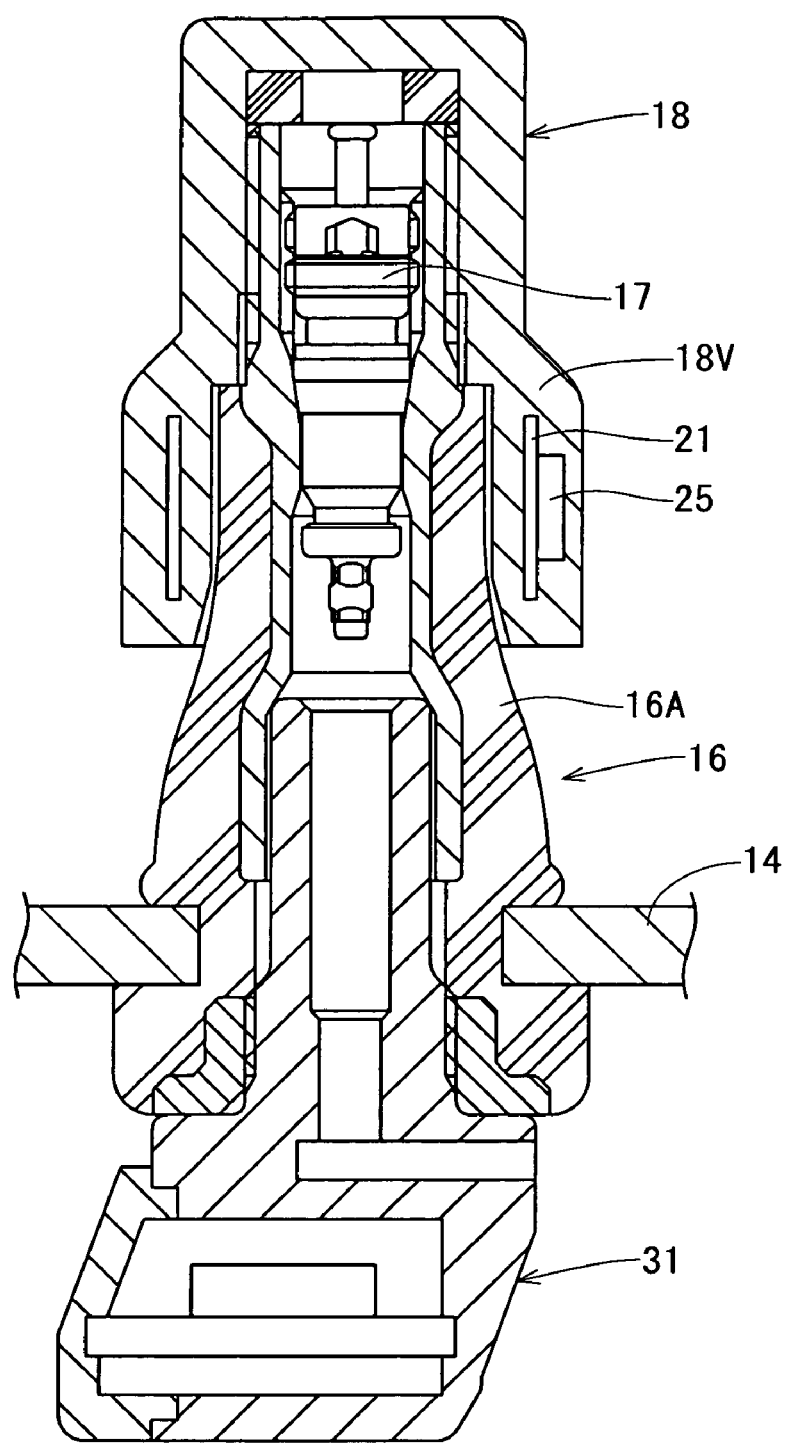
FIG. 12 is a sectional view of a tire valve in modified form 4.

(4) Still furthermore, a cylindrical extension 18V may be formed integrally with the open end of the cap 18, and the RFID tag 21 and the antenna 25 may be embedded in the cylindrical extension 18V as shown in FIG. 12.

(5) Additionally, the detecting device body 31 of the tire pressure detecting device 30 may be fixed to the tire valve 16, whereas the RFID tag 21 may be fixed to a part of the wheel 13 located away from the tire valve 16 (the tire 15 or outer surface of the tire wheel 14, for example).

(6) The invention may be applied to a tire pressure detecting device provided with a battery or no battery. Furthermore, the invention may be applied to the tire pressure detecting device with no battery, which is activated by an RFID system or a resonance system.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A tire pressure detecting device fixed to a wheel with a tire and including a pressure sensor detecting an internal pressure of the tire, the device transmitting data of detection by the pressure sensor to a vehicle body by radio, the device comprising:
   a compensation data storage storing compensation data reflecting detection error specific to the pressure sensor itself; and
   a compensation data transmitter obtaining the compensation data from the compensation data storage, transmitting the obtained compensation data to the vehicle body by radio.

2. The tire pressure detecting device of claim 1, further comprising a transponder including the compensation data storage and the compensation data transmitter and transmitting by radio the compensation data according to a radio signal delivered from the vehicle body side.

3. The tire pressure detecting device of claim 2, wherein the transponder is comprised of an RFID tag.

4. The tire pressure detecting device of claim 2, wherein the tire is provided with a tire valve to which the pressure sensor and the transponder are fixed.

5. The tire pressure detecting device of claim 3, wherein the tire is provided with a tire valve to which the pressure sensor and the transponder are fixed.

6. The tire pressure detecting device of claim 4, wherein the tire valve has an outer surface formed with a male thread and includes a ring member which is in threading engagement with the male thread, and the transponder is fixed to the ring member.

7. The tire pressure detecting device of claim 5, wherein the tire valve has an outer surface formed with a male thread and includes a ring member which is in threading engagement with the male thread, and the transponder is fixed to the ring member.

8. The tire pressure detecting device of claim 4, wherein the tire valve has a distal end to which a cap is attached, and the transponder is fixed to the cap.

9. The tire pressure detecting device of claim 5, wherein the tire valve has a distal end to which a cap is attached, and the transponder is fixed to the cap.

10. The tire pressure detecting device of claim 2, further comprising a detection data transmitter configured to transmit the detection data by radio apart from the transponder.

11. The tire pressure detecting device of claim 3, further comprising a detection data transmitter configured to transit the detection data by radio apart from the transponder.

12. The tire pressure detecting device of claim 10, further comprising an identification data storage storing common identification data transmitted by the detection data transmitter and the transponder by radio.

13. The tire pressure detecting device of claim 11, further comprising an identification data storage storing common identification data transmitted by the detection data transmitter and the transponder by radio.

14. A tire monitor system for monitoring an inner pressure of the tire comprising:
   a tire pressure detecting device fixed to a wheel with a tire and including a pressure sensor detecting an internal pressure of the tire, the device transmitting data of detection by the pressure sensor to a vehicle body by radio, the device including:
      a compensation data storage storing compensation data reflecting detection error specific to the pressure sensor itself; and
      a compensation data transmitter obtaining the compensation data from the compensation data storage, transmitting the obtained compensation data to the vehicle body by radio; and
   a tire receiver provided on the vehicle body configured to receive the detection data and the compensation data from the tire pressure detecting device, and compensating the detection data based on the compensation data.

15. The tire monitor system of claim 14, wherein the tire pressure detecting device further comprises a transponder including the compensation data storage and the compensation data transmitter and transmitting by radio the compensation data according to a radio signal delivered from the vehicle body side.

16. The tire monitor system of claim 15, wherein the transponder is comprised of an RFID tag.

17. The tire monitor system of claim 15, wherein the tire is provided with a tire valve to which the pressure sensor and the transponder are fixed.

18. The tire monitor system of claim 16, wherein the tire is provided with a tire valve to which the pressure sensor and the transponder are fixed.

19. The tire monitor system of claim 17, wherein the tire valve has an outer surface formed with a male thread and includes a ring member which is in threading engagement with the male thread, and the transponder is fixed to the ring member.

20. The tire monitor system of claim 17, wherein the tire valve has a distal end to which a cap is attached, and the transponder is fixed to the cap.

21. The tire monitor system of claim 15, wherein the tire pressure detecting device further comprises a detection data transmitter for transmitting the detection data by radio apart from the transponder.

22. The tire monitor system of claim 21, wherein the tire pressure detecting device further comprises an identification data storage storing common identification data transmitted by the detection data transmitter and the transponder by radio.

23. The tire monitor system of claim 21, further comprising:
   a compensation data obtaining unit which is provided on the vehicle body configured to receive a radio signal so that the transponder transmits the compensation data, thereby receiving the compensation data; and
   a detection data processing unit which is provided on the vehicle body configured to receive the detection data from the detection data transmitter and obtaining the compensation data from the compensation data obtaining unit, thereby compensating the detection data based on the compensation data.

24. The tire monitor system of claim 23, wherein the transponder is an RFTD tag and the compensation data obtaining unit is a tag reader.

25. The tire monitor system of claim 24, wherein the compensation data obtaining unit is a tag reader/writer.

* * * * *